(12) United States Patent
Barde

(10) Patent No.: US 6,439,510 B1
(45) Date of Patent: Aug. 27, 2002

(54) ELECTRICAL ENERGY MANAGEMENT AND ATTITUDE CONTROL SYSTEM FOR A SATELLITE

(75) Inventor: Henri Barde, Toulouse (FR)

(73) Assignee: Astrium SAS, Velizy Villacoublay (FR)

( * ) Notice: Subject to any disclaimer, the term of this patent is extended or adjusted under 35 U.S.C. 154(b) by 0 days.

(21) Appl. No.: 09/698,477

(22) Filed: Oct. 30, 2000

(30) Foreign Application Priority Data

Oct. 29, 1999 (FR) .............................................. 99 13631

(51) Int. Cl.[7] .................................................. B64G 1/28
(52) U.S. Cl. ........................................ 244/165; 244/164
(58) Field of Search ............................. 244/165, 158 R, 244/164; 322/4, 16, 38, 39; 310/76, 102 R

(56) References Cited

U.S. PATENT DOCUMENTS

| | | | |
|---|---|---|---|
| 4,723,735 A | * | 2/1988 | Eisenhaure et al. |
| 5,113,333 A | * | 5/1992 | Ou |
| 5,233,287 A | * | 8/1993 | Lenk |
| 5,611,505 A | * | 3/1997 | Smay |
| 5,773,962 A | * | 6/1998 | Nor |
| 5,826,829 A | * | 10/1998 | Holmes |

FOREIGN PATENT DOCUMENTS

| | | |
|---|---|---|
| EP | 0172781 | 5/1996 |
| EP | 0849170 | 6/1996 |
| FR | 2347716 | 11/1977 |
| FR | 2393364 | 12/1978 |

OTHER PUBLICATIONS

Ayer François et al.: "New Opportunities for Satellite Integrated Power and Attitude Control Systems" Proceeding of the Annual Meeting. Navigational Technology for the 3$^{rd}$ Milleniuim, Jun. 19, 1977, XP002096034—p. 832, col. 1, Alinea 2–Alinea 3—Fig. 1—p. 839, col. 1, Alinea 1–alinea2—Fig. 7.

* cited by examiner

Primary Examiner—Charles T. Jordan
Assistant Examiner—Tien Dinh
(74) Attorney, Agent, or Firm—Larson & Taylor PLC

(57) ABSTRACT

A system for managing electrical energy and for controlling attitude of a satellite has an attitude control unit which controls a plurality of reaction wheels oriented about different axes for instance three wheels. An on-board electricity power supply network has a solar array, a payload and a storage unit connected to a power line. The storage unit comprises a buffer supercapacitor and one inertia wheel unit with a respective motor/generator and typically two contra-rotating wheels. Interchanges between the storage units and the power supply line are controlled by a regulator which attenuates power demand transients and thus torque transients on the inertia wheel or wheels.

9 Claims, 2 Drawing Sheets

ELECTRICAL ENERGY MANAGEMENT AND ATTITUDE CONTROL SYSTEM FOR A SATELLITE

BACKGROUND OF THE INVENTION

The invention relates to systems for managing electrical energy and for controlling attitude in satellites, and a major, although non-exclusive, application thereof lies in satellites placed in low earth orbit (LEO) whose passages through the shadow cast by the Earth repeat at high frequency.

Satellites have an on-board electrical power supply network including a solar array and energy storage means enabling the payloads to be powered during periods in which the solar arrays are in shadow. They also typically include an attitude control unit that controls a plurality of reaction wheels rotating about different axes or a plurality of gyrodynes whose pivotal axes are oriented along different directions.

At present, the storage means are constituted by a battery of electricity storage cells of sufficient capacity to power the payloads during the periods in which the solar array does not receive flux or in which it receives insufficient light flux. Batteries suffer from the drawback of considerable weight. In addition, it is not possible to subject them to too many full discharges, so the amount of stored energy that is actually usable on a satellite in low orbit is relatively small.

SUMMARY OF THE INVENTION

An object of the invention is to provide a system for managing electrical energy on a satellite that satisfies practical requirements better than previously known systems; it is a more particular object to enable an increased amount of usable energy to be stored for given weight and size, without any corresponding degradation of attitude control.

To this end, the invention provides in particular a system comprising an attitude control unit controlling a plurality of reaction wheels oriented about different axes, and an on-board electricity power supply network having a primary power source such as a solar array, and storage means connectable to a power line. The storage means comprise a buffer capacitor and at least one inertia wheel with a respective motor/generator, interchanges between the storage means and the power supply line being controlled by a regulator designed to attenuate power demand transients and thus torque transients on the rotary equipment. The system can have a plurality of sets of pairs of inertia wheels or storage flywheels, oriented on different axes; in addition to one or two sets of inertia wheels, it can also have an additional wheel oriented along a third axis of a trihedron having three right angles.

Usable wheels already exist having a maximum speed of several tens of thousands of revolutions per minute (rpm).

In an advantageous embodiment, the rotary equipment comprises two contra-rotating storage wheels in axial alignment and driven at substantially the same speed, thereby reducing the total angular momentum of the rotary equipment, and thus reducing variations therein during acceleration or deceleration of the wheels. However, it is not possible to guarantee that the axes of rotation of the two wheels are in alignment with accuracy better than a fraction of a degree. The inevitable misalignment gives rise to large amounts of parasitic torque during periods of acceleration or of slowing down, particularly when power is taken or delivered suddenly. The harmful effect of this misalignment can be mitigated by increasing the attitude control capacity of the satellite. Because of physical limitations, this is not always possible, in which case it is advantageous to reduce the slope of transients in power demand from the storage wheels.

The discharge regulator can accept this power limitation on the generator(s) of the wheel(s), by calling on energy stored in the buffer capacitor, which means that the capacitor must have sufficient capacitance. Until recently, a capacitance of several Farads necessary for satisfying the needs of a satellite of the type commonly used at present for Earth observation or for telecommunications purposes would have required mass and volume that are incompatible with being installed on a satellite. However, so-called "super-capacitor" components now exist that make it possible to achieve the necessary capacitances with acceptable volume and weight.

The term "capacitor" as used herein should be understood as designating either a single capacitor, or else (as will usually be the case) a plurality of capacitors connected in parallel and/or series.

In practice, equipment having a single wheel would require the wheel to rotate at very high speed to make it possible to compensate for disturbing torque.

The structure defined above makes it possible not only to reduce the mass of the energy storage means, but also to expect a lifetime that is much longer than that of electrochemical storage batteries, at least when such batteries are called on frequently to stand in for solar arrays.

The above characteristics and others will appear more clearly on reading the following description of a particular embodiment, given by way of non-limiting example. The description refers to the accompanying drawings.

DETAILED DESCRIPTION

Figure 1:
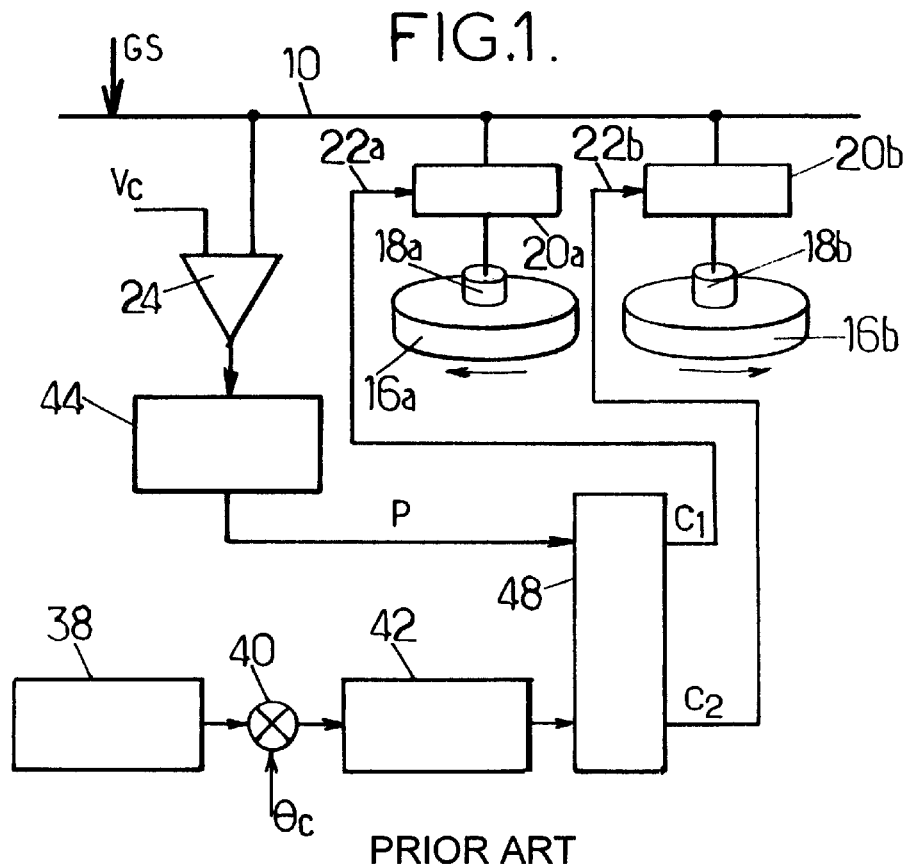
FIG. 1 is a simplified block diagram of the components of a system for controlling storage wheels on the assumption that their axes of rotation are in perfect alignment (prior art)

The portion of the integrated system for managing electrical energy related to the invention is shown diagrammatically in FIG. 1. The payload (not shown), the solar arrays GS, and the electricity storage means are connected to a power supply line 10.

The dynamic storage means comprise a pair of contra-rotating inertia wheels (flywheels) 16a and 16b, each coupled to a respective motor/generator 18a or 18b. Each motor/generator 18a (or 18b) is connected to the power supply line 10 via a regulator 20a (or 20b), whose function is described below. In general, the motor/generator is of the DC type with electronic commutation controlled by an input 22a (or 22b).

The wheels 16a and 16b are used both for storing energy and for controlling attitude about the pitch axis x.

For this purpose, the system has a sensor 38 which supplies the current roll pointing angle to a comparator 40 which also receives an attitude reference or set value $\theta_c$. The error signal is applied to a correction network 42 which transforms the angle error signal into a torque reference C.

The power P which is called when the solar array becomes inoperative can be evaluated by comparing a reference voltage $V_c$ with the actual voltage on the line 10. The error signal supplied by a comparator 24 is applied to a reference generator 44 for generating a "total power" reference or set value P. This total power is to be drawn from the storage wheels 16a and 16b.

To comply simultaneously with the power reference P and with the attitude reference, respective torques C1 and C2 must be taken from the wheels 16a and 16b where C1 and C2 are related to power P by the equation:

$$P=K1.C1.\Omega1+K2.C2.\Omega2$$

where $\Omega1$ and $\Omega2$ designate the speeds and K designates, for each wheel, a factor which is specific to the rotary unit and takes account of the moment of inertia (angular inertia) of the rotary equipment and the electrical efficiency of the motor/generators 18a and 18b.

From C and P, a mixer 48 generates reference values C1 and C2 such that C1−C2=C. They are converted into power set values, and thus into electrical current set values which are applied to the electronics controlling the motor/generators of the rotary equipments.

In reality, the wheels are in alignment only to within a fraction of a degree and this misalignment gives rise to an additional disturbing torque on the transverse axes. This torque leads to a pointing error which can be reduced sufficiently only:

by increasing the attitude control capacity (increasing the passband, integral control, open loop compensation, . . . ); and/or by decreasing torque transients, and thus decreasing variations in power profile.

Figure 2:
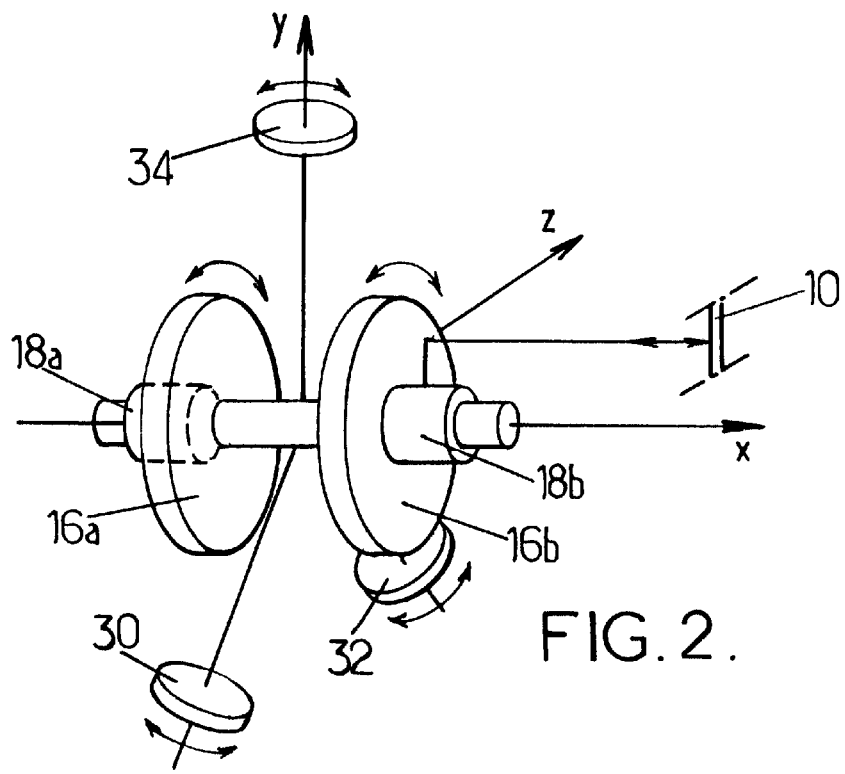
FIG. 2 is a diagram showing one possible distribution for the wheels of a system.

FIG. 2 shows one possible physical configuration for the storage wheels 16a and 16b and for reaction wheels for control about axes other than the axis of the storage wheels. These reaction wheels can be distributed so that their axes have different orientations and all such axes lie in a plane orthogonal to the common axis of the energy storage wheels 16a and 16b. Specifically, it is possible to use a set of three reversible reaction wheels 30, 32, and 34 whose axes are at 120° from one another. The common axis of the storage wheels is oriented along the x direction (pitch axis) for example, while the axes of the reaction wheels 30, 32, and 34 lie in the yz plane (the roll/yaw plane).

Figure 3:
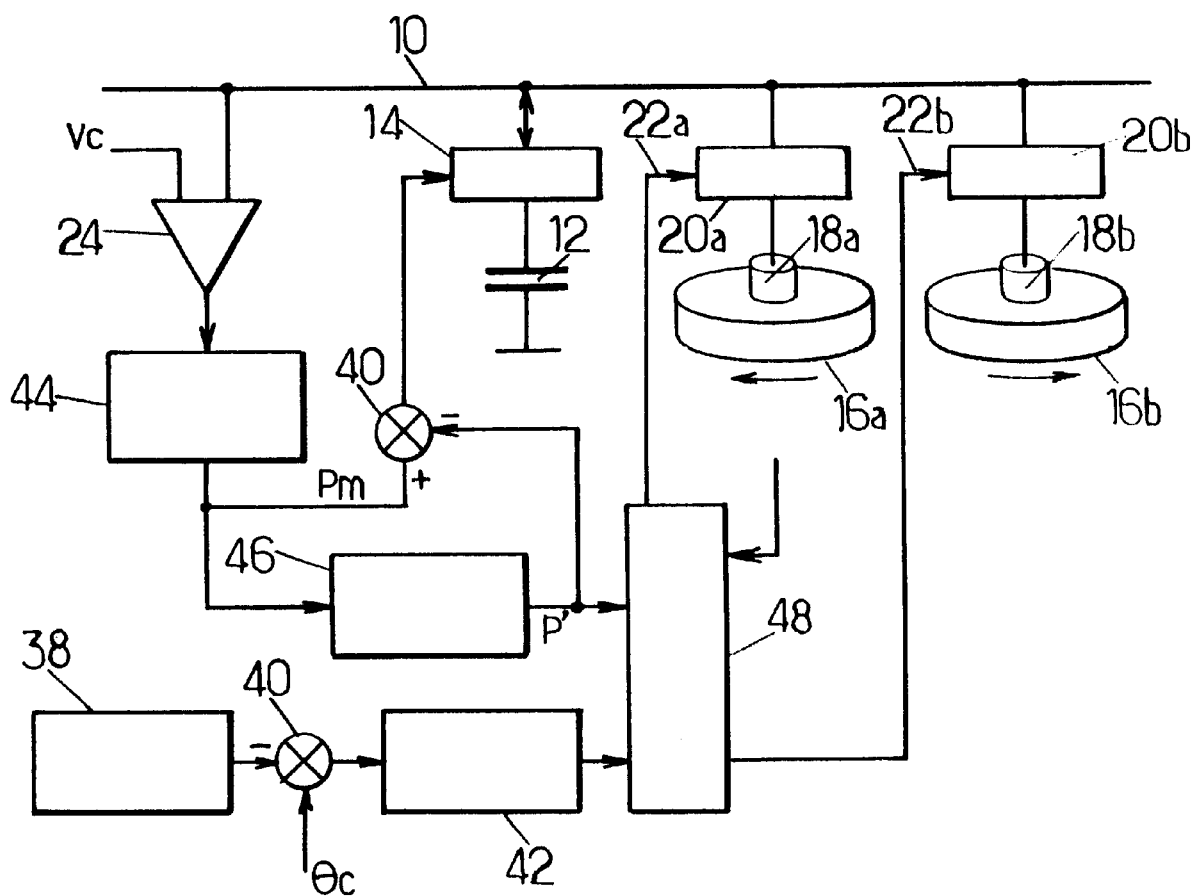
FIG. 3 is a simplified block diagram of the components of a system for controlling wheels while accommodating misalignment between their axes of rotation.

FIG. 3 shows a possible embodiment of the invention for accommodating the misalignment between the contra-rotating wheels in a single pair.

The principle on which control is applied about the common axis of the storage wheels, e.g. the pitch axis, is identical to that described for wheels in perfect alignment. However, in order to avoid demanding excessive amounts of torque from the reaction wheels situated on the transverse axes and in order to reduce the torque transients due to the misalignment, the slope of the power transients demanded from the storage wheels is restricted. This is achieved by means of filter 46.

Under such conditions, the power busline 10 does not receive the power being required, so it is necessary for an auxiliary energy storage device to make up the shortfall. This requirement is fulfilled by the super-capacitor 12 connected to the line 10 by a charge and discharge regulator 14.

A power demand occurs approximately in the form of a step $P_m$, in particular at the beginning of an eclipse. By way of example, the filter 46 can be designed to set a constant slope p of duration $\Delta t$ such that $P_m = p.\Delta t$. The value chosen for $\Delta t$ constitutes a compromise between a long duration which favors pointing accuracy, and a short duration which reduces the storage requirements of the capacitor. Under such circumstances, it is necessary to keep in mind that the restriction on the rate of variation is in respect of power and not of torque; the slope of variation in torque is consequently not the same at the beginning and at the end of an eclipse.

A modification consists in adopting a law which limits the slope of torque variation, e.g. a first-order lowpass filter.

In any event, the output from the filter 46 is a set power or power reference P' that is different from $P_m$ until steady conditions are achieved.

The residual power $P_m - P'$ as calculated by a subtracter 40, is applied to the electronics 14 controlling the charging and discharging current applied to or from the capacitor, which supplies the required additional energy.

The rotary unit constituted by the wheel 16a (or 16b) and the motor/generator 18a (or 18b) presents an electromotive force (emf) that is substantially proportional to speed and thus to the square root of the stored energy. The way it varies is comparable to the way the voltage across the terminals of the capacitor varies as a function of stored energy. It will often be possible to combine the regulators 14, 20a, and 20b, at least for distributing power demand amongst the wheels 16a and 16b and the capacitor 12. In the event of a sudden drop in power consumption, which would give rise to an increase in the voltage on the power supply line 10, the module 46 applies a new set value of the current to the regulator 48 that is lower than that which would allow the excess power to be absorbed. The excess is then absorbed by the super-capacitor 12.

I claim:

1. A system for managing electrical energy and for controlling attitude of a satellite comprising:

an on-board electricity power supply and storage network having a primary power source and a storage capacitor connected to a power line, at least one set of two mutually aligned counter-rotating inertia wheels each with a respective motor/generator, and a regulator for controlling electrical power interchanges between the motor-generators of said inertia wheels, the storage capacitor and the power line for attenuating power demand transients and torque transients applied to the inertia wheels by causing discharge and charge of the capacitor; and an attitude control assembly having a plurality of reaction wheels oriented about mutually different axes and a control unit controlling said reaction wheels for attitude control about axes other than a direction of alignment of said inertia wheels.

2. System according to claim 1, wherein said regulator comprises a filter for limiting the rate of variation of power called from and applied to the inertia wheel.

3. System according to claim 1, wherein the two mutually aligned counter-rotating inertia wheels are driven at substantially the same rotational speed.

4. System according to claim 1, wherein said regulator has means for distributing any torque call between the two inertia wheels of the set.

5. System according to claim 1, having a regulation circuit controlling a difference between torques each required from one of the two inertia wheels, responsive to an attitude error signal representing an error of position of the satellite about a common axis of the inertia wheels.

6. System for managing electrical energy and controlling attitude of a satellite, having:

an attitude control unit controlling a plurality of wheels oriented about mutually different axes, and an on-board electricity power supply network having a solar array constituting a power source; storage means comprising a buffer storage capacitor and a rotary unit having two contra-rotating inertia flywheels mutually aligned along a common axis different from said mutually different axes, each having a motor-generator; and regulator means for controlling power transfers between power receivers on the satellite, said storage means and said solar array, said regulator being arranged to attenuate power demand transients or power delivery transients, and thus torque transients, from and to the rotary unit responsive to power call from the payload and variations in power delivered by the solar array.

7. System according to claim 6, wherein said regulator means includes means for determining set values of the torque calls required from each of said flywheels for control of attitude of the satellite about said common axis.

8. System according to claim 6, wherein the common axis is a pitch axis of the satellite and said mutually different axes of said reaction wheels are located in a yaw-roll plane.

9. System according to claim 7, wherein said regulator means are arranged for imparting a set time variation of constant slope to the torque transient.

* * * * *